June 16, 1942.  L. D. LIBBY  2,286,821
MACHINE FOR CUTTING DIES AND THE LIKE
Filed Feb. 23, 1939  6 Sheets-Sheet 1

Inventor
L. D. Libby
By his Attorneys
Michael & Michael

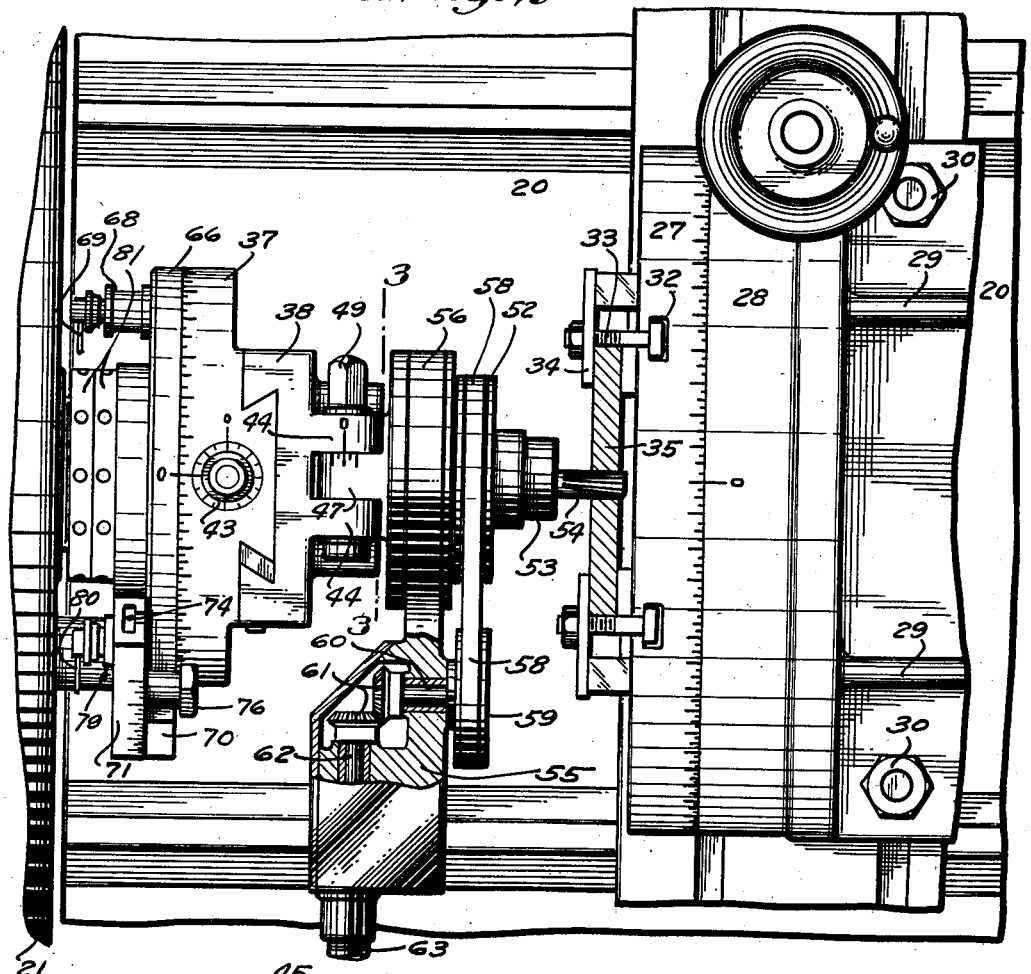
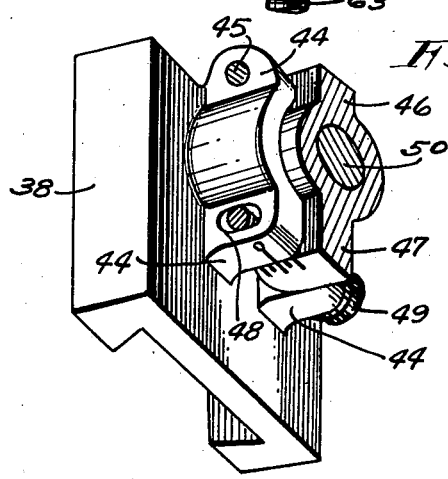

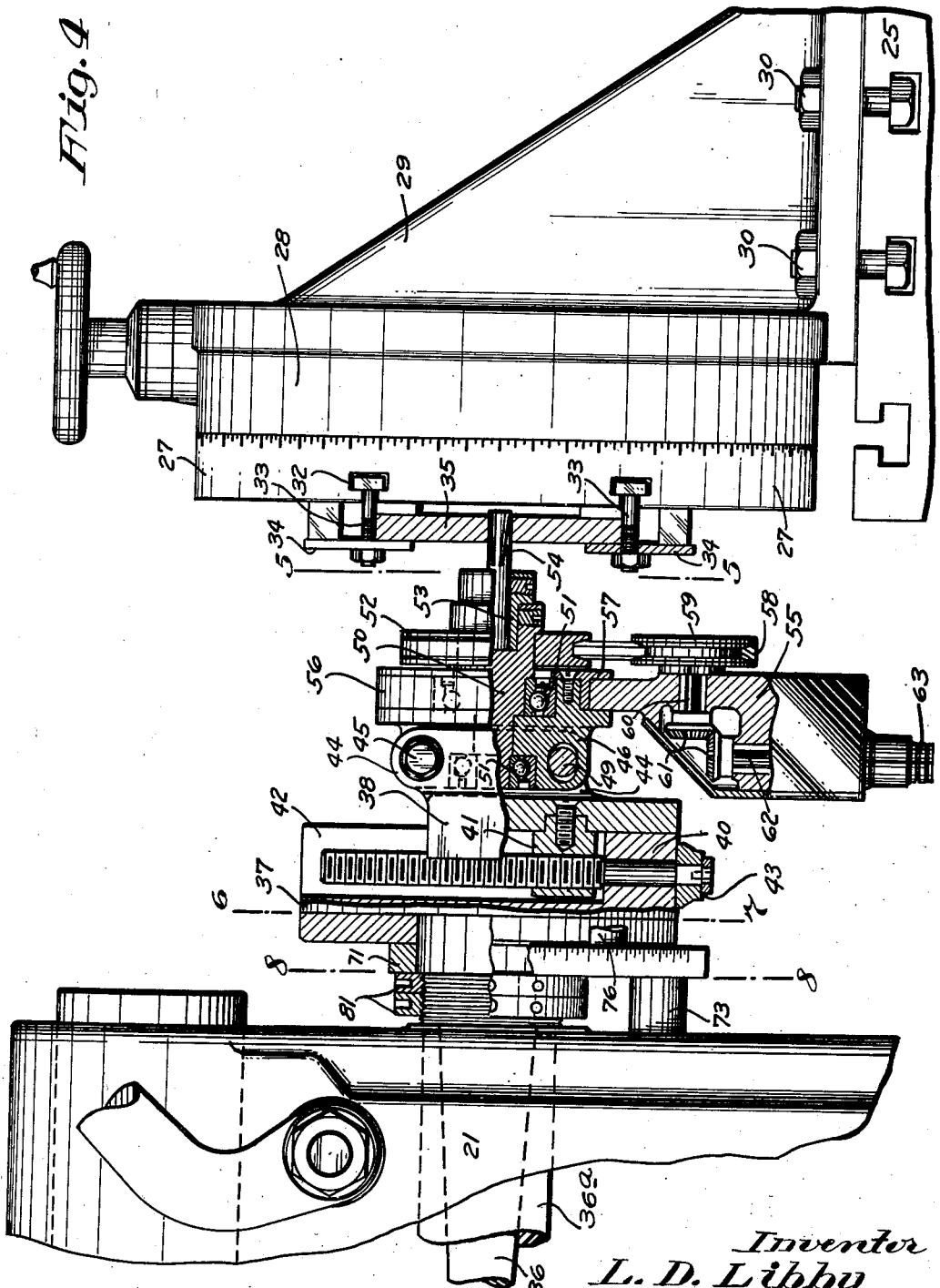

June 16, 1942. L. D. LIBBY 2,286,821
MACHINE FOR CUTTING DIES AND THE LIKE
Filed Feb. 23, 1939 6 Sheets-Sheet 4

Inventor
L. D. Libby
By his Attorneys

June 16, 1942.   L. D. LIBBY   2,286,821
MACHINE FOR CUTTING DIES AND THE LIKE
Filed Feb. 23, 1939   6 Sheets-Sheet 5

Inventor
L. D. Libby
By his Attorneys
Merchant & Merchant

June 16, 1942.                L. D. LIBBY                2,286,821
                 MACHINE FOR CUTTING DIES AND THE LIKE
                      Filed Feb. 23, 1939           6 Sheets-Sheet 6

Inventor
L. D. Libby
By his Attorneys
Michael & Michael

Patented June 16, 1942

2,286,821

UNITED STATES PATENT OFFICE 2,286,821

MACHINE FOR CUTTING DIES AND THE LIKE

Lloyd D. Libby, Minneapolis, Minn.

Application February 23, 1939, Serial No. 257,888

7 Claims. (Cl. 90—17)

My invention relates particularly to the art of cutting or making dies. The invention provides an improved machine especially designed for the making of dies or molds but adapted for a more extended use in the cutting or grinding of various different designs in metal or other hard substances.

The conventional way of making steel dies is a slow, laborious and costly operation. Under the usual practice it is necessary to accurately mark or lay out the design of the die or mold on a steel plate and by hand operations cut these dies or molds to the marked lines; thus making the cutting of dies or molds a slow and costly operation requiring the finest of manual workmanship to obtain accuracy.

By the use of my improved machine, dies or molds can be cut from steel plates with the greatest accuracy, simply by the proper setting of the machine according to the furnished diagram or pattern; and then the dies or molds can be cut by the machine operations and without any time marking or laying out the pattern on the dies blank. The word die will hereinafter be used to mean either what is commonly called a die or what is commonly called a mold.

The above statements will be more thoroughly appreciated after having described the construction and operation of a machine designed in accordance with my invention. However, before proceeding with the description it may be stated in a general way that the illustrated machine embodying the invention involves certain features or structures found in or quite analogous to those found in milling machines and lathes.

A working form of this machine is illustrated in the accompanying drawings wherein like characters indicate like parts throughout the several views.

Referring to the drawings:

Fig. 2 is a plan view of the machine shown in Fig. 1, some parts being broken away and some parts being shown in section;

Fig. 3 is a perspective in section on the line 3—3 of Fig. 2;

Fig. 4 is a view quite similar to Fig. 1 but with some parts broken away and some parts sectioned and with the parts shown on a larger scale than in Fig. 1;

Figure 1:
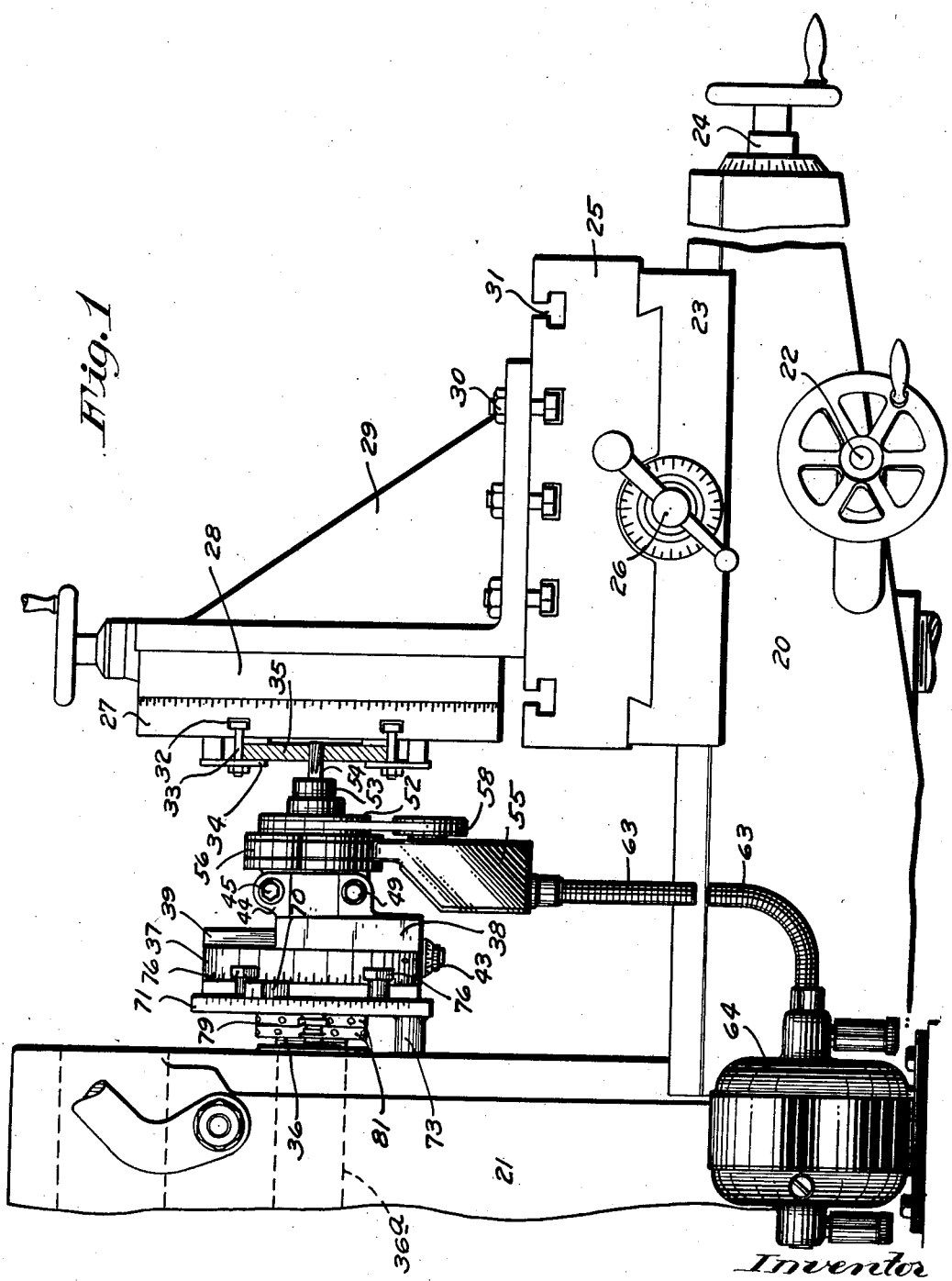
Fig. 1 is a side elevation showing the improved machine, some parts being broken away and some parts being sectioned.

Referring first to those features of the machine that are quite generally found either in the identical or very similar form in lathes and milling machines, numeral 20 indicates the machine bed that is mounted for vertical movements on a standard 21 that is a fixed part of the machine frame. The bed 20 is mounted for vertical movements under control of the customary adjusting means including a hand wheel-equipped shaft 22. The numeral 23 indicates the machine carriage mounted to slide on the bed 20 toward and from the standard 21 under the action of the customary manually operated screw shaft 24. The numeral 25 indicates a cross slide mounted for transverse sliding movements on the carriage 23 adapted to be adjusted by the customary worm or screw shaft 26.

Rigidly or adjustably mounted on the cross slide 25 is a rotary work-holding attachment preferably such as that known to the trade as the Brown and Sharpe rotary attachment and described on page 83 of the Brown and Sharpe Catalog No. 140. For the purposes of this case it is only necessary to particularly note the rotary table 27 that is applied to the body plate 28, which in turn, is secured to or formed as part of an anchoring bracket 29, the base of which latter is rigidly secured on the cross slide 25 by nut-equipped bolts 30, the heads of which work in slots 31 of the cross slide and permit transverse adjustments of the entire attachment. The rotary table 27 has the customay T-shaped grooves 32 for nut-equipped clamping bolts 33 that act on clamping bars 34 to hold in position the die blank or work plate 35.

By means already described it is obvious that the die blank or work plate 35 may be moved upwardly by vertical adjustments of the bed 20; that said work plate may be moved bodily toward and from the standard 21, by adjustments of the carriage 23; that said die blank can be moved transversely by adjustments of the cross slide 25; and that said die blank can be rotated by rotary adjustments of the rotary table 27.

Figure 5:
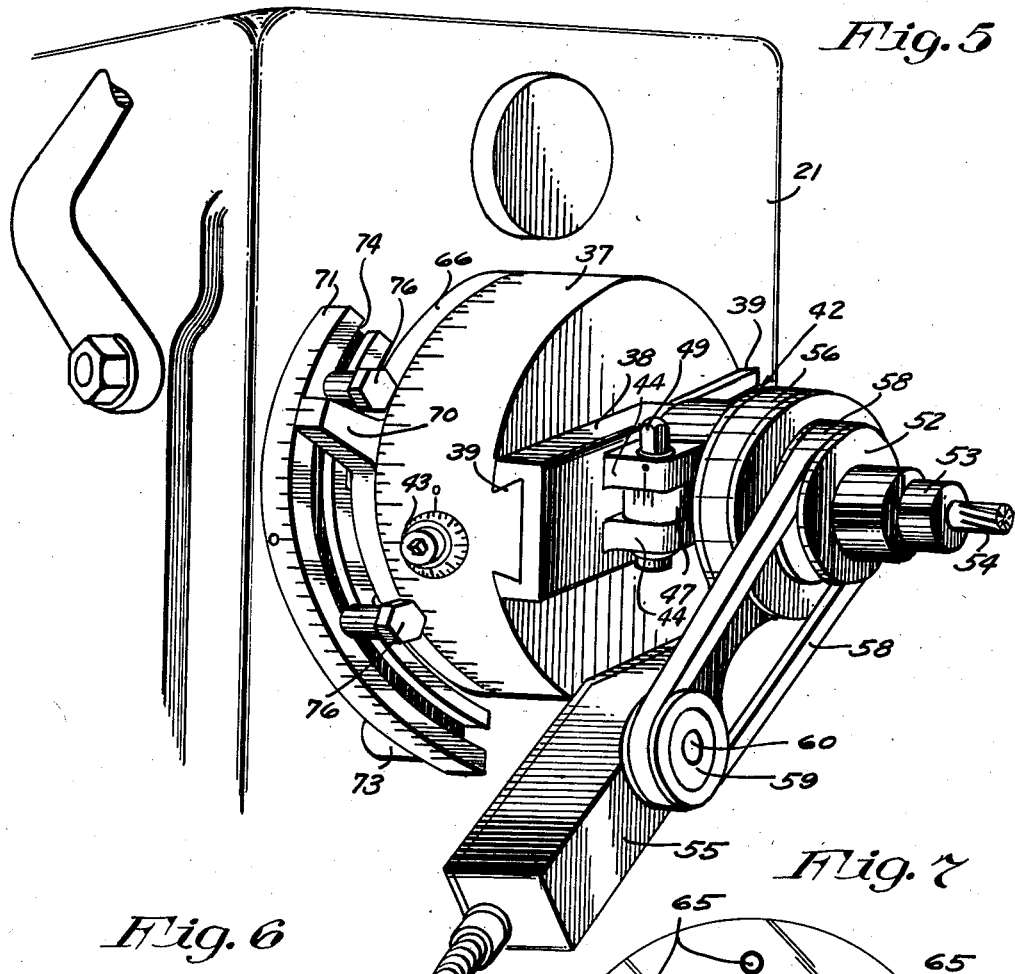
Fig. 5 is a perspective showing the parts of the machine found just at the left of the line marked 5—5 on Fig. 4.

A tapered shank 36 is detachably but rigidly anchored in the tapered bore of the main spindle 36a of the standard 21. At its projected forward end the shank 36 is provided with a large disc-like head 37; and mounted to slide on and diametrically of the front face of the head 37 is a crank-acting slide or cross-head 38. The connection between the slide 38 and the head 37, see particularly Figs. 4 and 5, is made by a dovetail connection 39. To impart radial adjustments to the slide 38, an adjusting screw 40 is journaled in one end of the head 37 and engages a nut block 41 secured to said slide. The head 37 is formed with a clearance groove 42 for the nut block 41 and screw 40. At its outer end the screw 40 is shown as provided with an operating knob 43 that is preferably graduated or provided with a vernier dial shown in Fig. 5.

The slide 38, see particularly Figs. 2, 3, 4 and 5, is provided with spaced hinge flanges 44 to which at 45 is hinged an angularly adjustable tool spindle-carrier head 46.

At a point diametrically opposite to the pivot 45 the head 46 has a segmental flange 47 that is graduated to cooperate with the index mark 0 on the adjacent end of one of the flanges 44. The last noted ends of the flanges 44 are provided with slots 48 through which and a hole in the graduated flange 47 works a nut-equipped clamping bolt 49 which, when tightened, holds the head 46 in set adjustment.

Journaled in the head 46 is a tool carrying spindle 50 which, as shown, is mounted in said head with ball bearings 51, see particularly Fig. 4.

Keyed or otherwise secured to the projecting end of the tool spindle 50 is a drive wheel shown in the form of a pulley 52, and forward of the pulley 52, said spindle is formed with a suitable tool chuck 53 that detachably holds the cutting tool 54 which, as illustrated, is a milling tool.

As an important feature of this invention, I have provided a very novel power means for driving the tool carrying spindle 50 without interfering with any of the other movements or adjustments of the cutting tool. This device, as shown, involves a floating transmission head 55 that is hung on the crank-acting bearing head 46 and partakes of the planetary but not the rotary movements thereof. This mounting is shown as made by providing the head 55 with an annular flange or collar 56 that is loosely mounted on a hub-like portion of the head 46 and is held in place thereon by a detachable annular retaining ring 57.

A belt 58 runs over the pulley 52 and over a similar pulley 59 that is secured on the outer end of a short shaft 60 journaled in the transmission head 55 and connected by beveled or miter gears 61 to a shaft 62. The shaft 62 is connected by a transmission device, preferably a flexible driving shaft 63, that extends from the rotor of an electric motor 64, see particularly Figs. 1 and 4. The motor 64 may be supported in any suitable way either by a fixed part of the machine or otherwise.

Figures 6, 7:
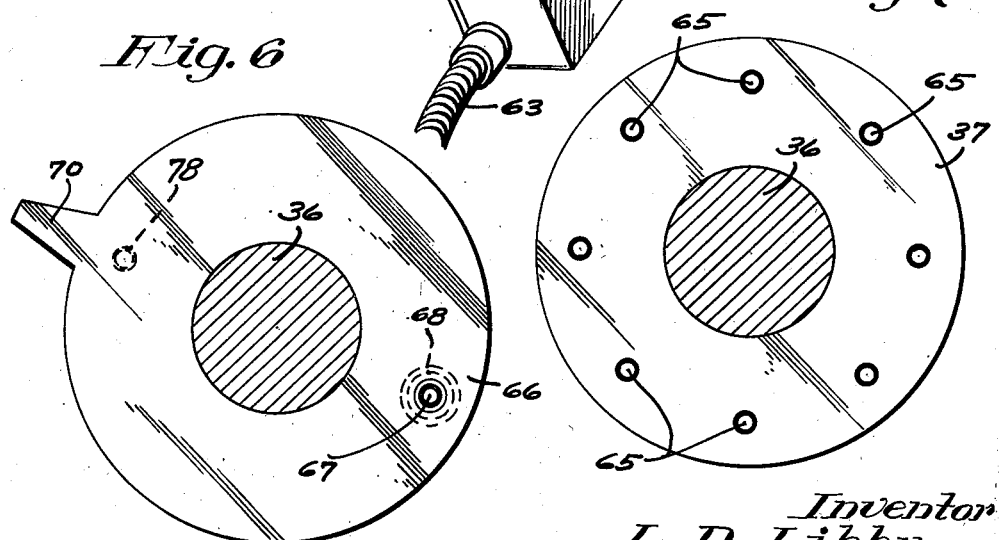
Figs. 6 and 7 are face views showing respectively elements immediately at the left and right of the line marked 6—7 on Fig. 4.
Figure 8:
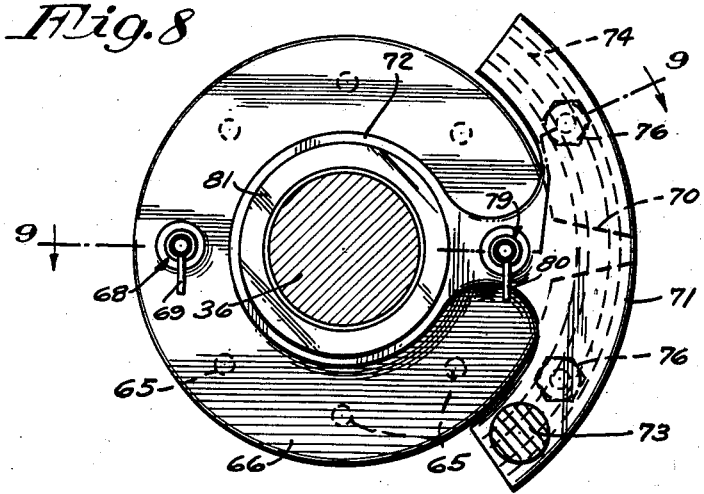
Fig. 8 is a section taken on the line 8—8 of Fig. 4 looking toward the right.
Figure 9:
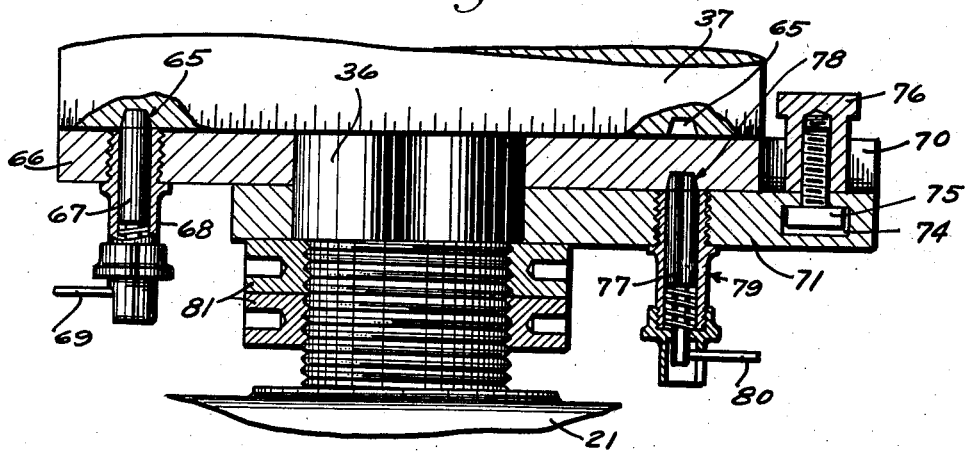
Fig. 9 is a view partly in plan and partly in section on the line 9—9 of Fig. 8, some parts being broken away.

The spindle head 37 already described is peripherally graduated to indicate degrees and fractions thereof, and for a special purpose, as shown, is provided in its flat rear surface with lock seats 65, see particularly Figs. 7, 8 and 9, which in the arrangement illustrated, are located 45° apart. Rotatably mounted on the spindle 36 and working closely against the back of the head 37 is an annular stop plate 66. This stop plate 66, see particularly Figs. 6 and 9, is provided with a spring pressed lock pin 67 that is adapted to engage in one of the lock seats 65 of the head 37. This lock pin 67, as shown, is directly mounted in a tubular casing 68 applied to the stop plate 66. Also, the stem of the lock pin 67 is provided with a laterally projecting finger 69, which when pulled outward and turned laterally over the end of the casing 68, holds the lock pin 67 retracted. The stop plate 66, see particularly Figs. 5 and 6, is provided with a projecting lug or finger 70.

Working face to face against the stop plate 66 is an anchored stop plate or element 71 that may take various forms but, as shown, is in the form of a segment connected to a ring 72 that surrounds the spindle 66. This segment 71, in the arrangement illustrated, is anchored directly to the standard 21 by a stud or projection 73, see particularly Figs. 1 and 4. Segment 71 is graduated in degrees and fractions thereof and is formed with an undercut segmental slot 74 that is T-shaped in cross section and in which works headed screws 75, see particularly Fig. 9, provided with cap nuts 76 which, when tightened, are locked to the segment and afford stops for cooperation with the projecting lug or finger piece 70 of the stop plate 66. Also, the anchored stop plate 71 is provided with a spring pressed lock pin 77 that cooperates with a lock seat or notch 78 in the relatively rotatable lock plate 66. The lock pin 77 is shown as mounted in a tubular casing 79 shown as screwed into the segment 71. The stem of said lock pin 77 is provided with a laterally projecting finger piece 80 which, when pulled outward and turned against the end of the casing 79, locks the pin 77 in an inoperative position. Numeral 81 indicates take-up rings having threaded engagement with the spindle 36 and which serve to hold the lock plate 66 and the hub of the segment 71 in close engagement with each other and with the spindle head 37.

Figure 11:
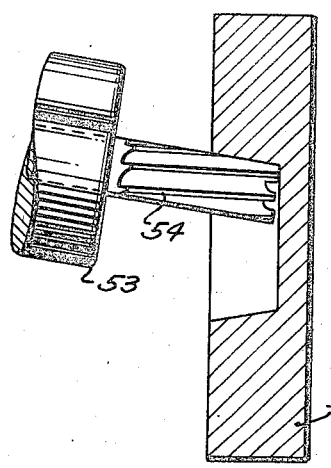
Figs. 11, 12 and 13 are views partly in elevation and partly in section illustrating different kinds of work that can be done with the machine.
Figure 12:
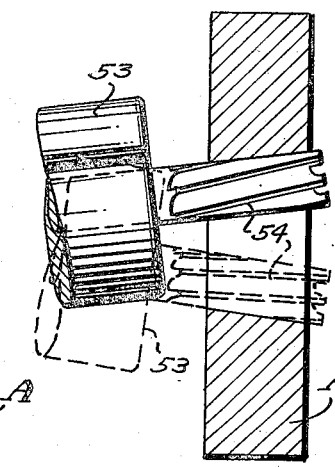
Figure 13:
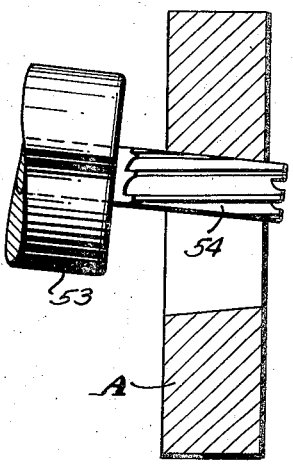
Figure 15:
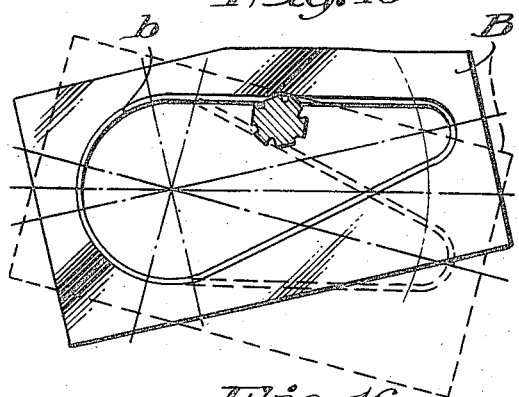
Figs. 14, 15 and 16 are elevations illustrating various other uses of the machine.
Figure 14:
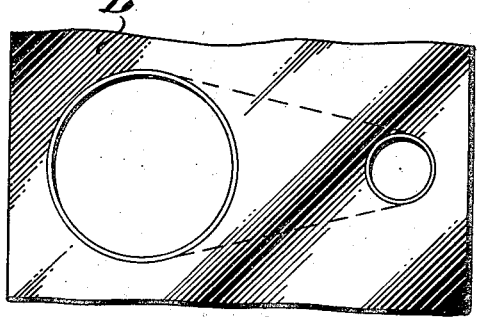
Figure 16:
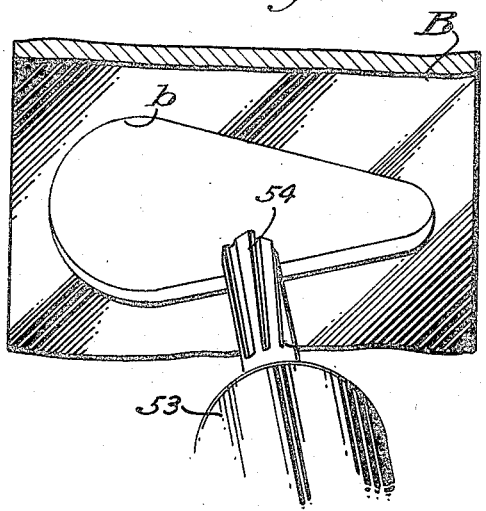
Figure 17:
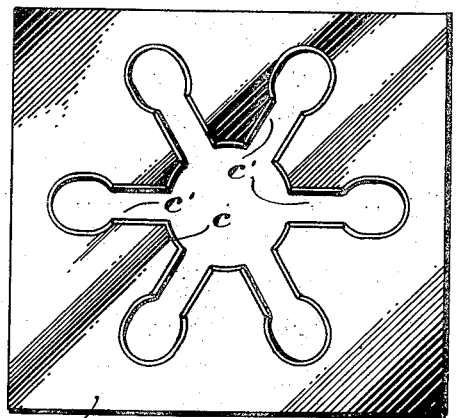
Fig. 17 is a plan or face view illustrating a radial figure that may be cut by the use of the machine.

Referring to Figs. 11, 12 and 13, the die blank is indicated by the character A; in Figs. 14, 15 and 16 the die blank is indicated by the character B; and in Fig. 17 the die blank is indicated by the character C. The manner of cutting the die blank is illustrated in the several views 11 to 17 inclusive and will be more fully considered in the description of the operation of the machine.

By reference to Fig. 6 it will be noted that the lock seat 78 of the lock plate or ring 66 is in radial line with the finger piece 70 and that the lock pin 66 is diametrically opposite to the lock seat and finger piece.

*Operation*

The operation of the machine illustrated in the drawings will now be described in its use for producing certain of the many different kinds of work that can be readily performed by the machine.

If the head 46 of the tool carrying spindle 50 be set to position the cutting tool 54 in a plane perpendicular to the work, and the crosshead slide 38 be adjusted to set the tool with its axis coincident with the axis of the spindle 36, then the tool will be positioned for boring a hole or depression the diameter of the cutting tool, providing of course, that the cutting tool be then rotated, and the work moved toward the tool. Movement of the work toward the tool will be manually controlled by movement of the machine carriage 23 on the table 20.

To bore a hole or cut a recess of greater diameter than the cutting tool, the slide or crosshead 38 must be adjusted so as to set the cutting tool the proper distance away from or eccentric to the axis of the shank 36. When this adjustment is properly made, the cutting tool will be power driven from the electric motor, through the transmission mechanism illustrated, and it is obvious that this transmission mechanism includes the flexible shaft or transmission element that will automatically adapt itself to and follow the planetary or gyratory movements of the tool carrier. The planetary movements of the tool carrier will be produced by rotation of the spindle 36 and the parts carried thereby. Rotation of the said spindle may be produced in various ways, but preferably will be manually produced or controlled, so that the cutting tool will not be forced to its work too rapidly. For example, with the ordinary lathe transmission and driving belt the machine can be manually produced and controlled by pulling on the belt and slowly rotating the spindle at a speed determined by the cutting action of the tool, as observed or felt by the operator. Thus, it will be noted that the rotation of the cutting tool and the planetary movement thereof are through independent means.

Advance of the tool through the die blank or work plate is controlled by sliding movements of the carriage 23 on the bed 20. If while the tool is being operated as described, the cross slide 25 be moved transversely, the cutting tool will then cut a groove or slot. If the groove or slot thus cut by transverse movement of the cross slide is with the tool set as first described concentric to the axis of the spindle 36a, then the groove cut will be the width of the cutting tool; but if the planetary movement is also imparted to the cutting tool, the width of the slot will be that of the circle cut by the tool. For this work the cutting tool will usually be in the form of an end mill that will cut at its sides as well as at its ends.

By angular adjustments of the spindle carrier head 46, the tool can be set at an angle to the axis of rotation of the head 37 either as shown in Fig. 12 or as shown in Figs. 11 and 13, and in either event the tool will partake of conical motion and the hole or depression will be formed with a taper in the one direction or the other and in this way any desired taper can be cut and, of course, the cut can be made either completely or partly through the die blank.

As further concrete illustration of the use of the machine, attention is next called to Figs. 14, 15 and 16. In making a cut such as there shown, the slide or cross head 38 will be adjusted to an eccentric position that will cause the cutting tool, while it is being rotated on its own axis, to make a planetary movement that will cut, for example, a large circular end b in the die plate B. When this has been done, the die blank, by rotary adjustment of the graduated table 27, will be set so that one of the sides of the tapered slot will be in a horizontal position, and then by transverse adjustments of the cross slide 25 the blank will be moved until the tool has cut the small end of the slot; and thereafter the blank, by further adjustments of the table 27, will be set so that the other side of the proposed slot is horizontal and then by reverse transverse movements of the cross slide, the blank will be moved until the tool has reached the tangential point on the large circular cut b.

From the foregoing it is to be understood, of course, that the cut such as shown in Fig. 15 can be made either with straight or beveled edges.

To cut a design such as shown in Fig. 17, the machine would be set first to cut a large central opening. The design here shown has six radial arms or radial portions located 60° apart. After the large central opening c has thus been cut, the tool should be set for various slight movement from the axis of the spindle 36 so as to cut the proper width of radial slots c'. In cutting these radial slots, the work will be progressively set 60° in advance by the like rotation of the table 27. In forming the radial slots c' the die blank will have to be each time moved back to a starting point, to wit, with the center of the large opening c at the axis of the shank 36. These movements for producing radial cuts in the die blank are produced by transverse movements of the cross slide 25. When the slots c' are cut to their outer extremities to produce enlargement of these outer extremities, the machine will have to be set for imparting the proper planetary movement to the cutting tool.

Figure 10:
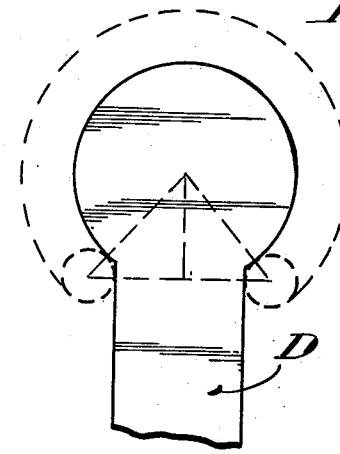
Fig. 10 is a diagram illustrating one kind of work that can be performed with the machine.

In the above described operations it has been assumed that the cut produced can be made by complete planetary movements of the cutting tool. Sometimes, however, it is desirable to cut either the external or internal surface or a groove to the extent of less than 360°. An illustration of this kind of cut is shown in Fig. 10. Normally and for the operations above described, the lock pin 67 will be retracted and the head 37 and spindle 36 will be free to make complete rotations while the stop plate 66 will be locked to the anchored member 71.

To make a segmental cut either external or internal or to cut a segmental slot or groove that is less than 360°, the stop devices 76 should be set for cooperation with the projection or lug 70 on the rotatably adjusted stop ring or plate 66. When such cuts are to be made, the stop plate 66 should be locked to the heads 37 by the lock pin 67; and the stop plate 66 should be released and the stop pin 77 retracted so as to release the plate 66, so that the latter will be limited in its movement only by the properly set stop devices 76. When lock pin 67 is retracted but not locked in its retracted position, it will drop into one or the other of the seats 65 of the head 37 at each 45° of rotation of the head. If the required degrees of movement of the head to make the segmental cut is not in fractions of 45°, then the additional fraction less than 45° will be determined by the proper setting of the stops 76 indicated by the graduations on the fixed segment or plate 71.

If, however, the lug or projection 70 of the rotatable stop plate 66 be set, for example, beyond the upper stop 76, the plate 66, and hence the head 37, will be free for movement through 360° minus the degrees subtracted from the spacing between the said stops 76. In this latter noted event if, for example, the segmental cut is to extend through 280°, the stops 76 would be set apart 80°, and then with the plate 66 locked to the head 37, the cutting tool could be caused to travel through an arc of only 280°. If the segmental cut is to be wider than the diameter of the cutting tool, then the machine must be set, as already described, so that the cutting tool, while it is being rotated, will be given a planetary travelling movement sufficient to cut a segmental groove the desired width.

For finally finishing any of the surfaces cut as described, a suitable grinding wheel or spindle may be substituted for the cutting tool 54. This tool would, of course, be the mechanism equivalent of the cutting tool 54.

Whereas the invention is herein described and illustrated in connection with a horizontal milling machine it should be understood that the invention can also be used in connection with the rotary spindle and rotary work holding devices of various different machines such, for example, as vertical milling machines or jig machines.

What I claim is:

1. In a machine of the kind described, a rotary main member, a crank-acting cross head mounted on said main member for adjustments radially thereof, a tool-spindle carrier head mounted on said cross head, a tool-carrying spindle rotatively mounted on said tool-spindle carrier head, and power means connected to said tool-carrying spindle and constructed and arranged to rotate said tool-carrying spindle while the latter is subject to planetary movements, due to rotation of said main rotary member, in which the said power means for rotating said tool-carrying spindle involves a remotely connected motor with flexible driving connections to said tool-carrying spindle, said power means further including a transmission supporting head swiveled around said tool-carrying spindle, free from rotation therewith, but free to partake of the planetary and angular movements of said tool-carrying spindle.

2. The structure defined in claim 1 in which said tool is capable of angular adjustments in respect to the axis of its planetary movement.

3. In a machine of the kind described, a rotary main member, a crank-acting cross head mounted on said main member for adjustments radially thereof, a tool-spindle carrier head mounted on said cross head for radial adjustments therewith and for angular adjustments in respect to the axis of said rotary main member, a tool-carrying spindle rotatively mounted on said tool-spindle carrier head, and power means connected to said tool-carrying spindle, constructed and arranged to rotate said tool-carrying spindle while the latter is subject to planetary movements due to the rotation of said main member, in which the said power means for rotating said tool-carrying spindle involves a remotely connected motor with flexible driving connections to said tool-carrying spindle, said power means further including a transmission supporting head swiveled around said tool-carrying spindle, free from rotation therewith, but free to partake of the planetary and angular movements of said tool-carrying spindle.

4. In a machine of the kind described, a rotary main member, a crank-acting cross head mounted on said main member for adjustments radially thereof, a tool-spindle carrier head hingedly mounted on said cross head for angular adjustments in respect to the axis of said rotary main member, a tool-carrying spindle rotatively mounted on said tool-spindle carrier head, means for locking said tool-spindle carrier head in different angular adjustments, while free for radial adjustments with said cross head, and power means connected to said tool-carrying spindle including a remote motor, a non-rotary transmission head swiveled on said tool-spindle carrier head, transmission gears journaled on said transmission head, a belt and pulley drive between said gears and tool-carrying spindle, and a flexible shaft connecting said motor to the gears of said transmission head.

5. The structure defined in claim 4 in which said power means for rotating said tool-spindle carrier head involves a pulley on the latter, a transmission head swiveled on said tool-spindle carrier head, shafts mounted on said transmission head and connected by beveled gears, a pulley on one of said shafts, a belt running over said last noted pulley and the pulley on said tool-spindle carrier head, a motor remote from the mechanism described, and a flexible shaft connecting the rotor of said motor to the other of the shafts on said transmission head.

6. In a machine of the kind described, a rotary main member, a crank-acting cross head mounted on said main member for adjustments radially thereof, a tool-spindle carrier head mounted on said cross head, a tool-carrying spindle rotatively mounted on said tool-spindle carrier head, and power means connected to said tool-carrying spindle and constructed and arranged to rotate said tool-carrying spindle and constructed and arranged to rotate said tool-carrying spindle while the latter is subject to planetary movements, due to rotation of said main rotary member, in which the said power means for rotating said tool-carrying spindle involves a remotely connected motor with flexible driving connections to said tool-carrying spindle, said power means further including a transmission supporting head swiveled around said tool-carrying spindle, free from rotation therewith, but free to partake of the planetary movements of said tool-carrying spindle.

7. In a machine of the kind described, a rotary main member, a crank-acting cross head mounted on said main member for adjustments radially thereof, a tool-spindle carrier head mounted on said cross head for radial adjustments therewith and for angular adjustments in respect to the axis of said rotary main member, a tool-carrying spindle rotatively mounted on said tool-spindle carrier head, and power means connected to said tool-carrying spindle, constructed and arranged to rotate said tool-carrying spindle while the latter is subject to planetary movements due to the rotation of said main member, in which the said power means for rotating said tool-carrying spindle involves a remotely connected motor with flexible driving connections to said tool-carrying spindle, said power means further including a transmission supporting head swiveled around said tool-carrying spindle, free from rotation therewith, but free to partake of the planetary movements of said tool-carrying spindle.

LLOYD D. LIBBY.